COMMON JOINT SIDE

United States Patent Office 3,514,727
Patented May 26, 1970

3,514,727
FILTERS HAVING LOW DELAY AND ATTENUATION DISTORTIONS
Akio Matsumoto, Sapporo-shi, and Kinya Toyama and Kiyomi Kondo, Yokohama-shi, Japan, assignors to Toyo Tsushinki Kabushiki Kaisha, Kanagawa-ken, Japan, a joint-stock company of Japan
Continuation-in-part of applications Ser. No. 298,149, July 29, 1963, and Ser. No. 699,977, Jan. 19, 1968. This application Feb. 18, 1969, Ser. No. 800,238
Int. Cl. H01h 7/10
U.S. Cl. 333—76      2 Claims

ABSTRACT OF THE DISCLOSURE

An improved filter having low delay and/or attenuation distortion and consisting of a lumped constant four terminal network and an improved filter having low delay and attenuation distortions and real frequency attenuation poles at attenuation range and consisting of a lumped constant four terminal network. The network is composed of circuit elements including respectively inductance and capacitance which are obtained from a spectral impedance $$(Z_{2s}^{(m+1)})_{sp}$$

or spectral admittance $$(Y_{2s}^{(m+1)})_{sp}$$

thereof corresponding to two terminal short-circuit impedance $$(Z_{2s}^{(m+1)})$$

or admittance $$(Y_{2f}^{(m+1)})$$

thereof which is obtained by superposing the short-circuit impedances $$(Z_{2s}^{m})$$

and $$(Z_{2s}^{(m+1)})$$

or superposition of the short-circuit admittances $$(Y_{2f}^{m})$$

and $$(Y_{2f}^{(m+1)})$$

at a ratio of $1/n$, where $m$ and $n$ are integers and in which $$Y_{2f}^{m} \text{ (or } Z_{2s}^{m})$$

and $$Y_{2f}^{(m+1)} \text{ (or } Z_{2s}^{(m+1)})$$

are represented by the following equations respectively;

$$Y_{2f}^{m} \text{ (or } Z_{2s}^{m}) = j\frac{2}{\pi} \cdot \frac{\Omega\left(1-\frac{1}{4}\Omega^2\right) \ldots \left(1-\frac{1}{(m-2)^2}\Omega^2\right)}{(1-\Omega^2)\left(1-\frac{1}{9}\Omega^2\right) \ldots \left(1-\frac{1}{(m-1)^2}\Omega^2\right)}$$

(in the case of grade $m$)

$$Y_{2f}^{(m+1)} \text{ (or } Z_{2s}^{(m+1)}) = j\frac{2}{\pi} \cdot \frac{\Omega\left(1-\frac{1}{4}\Omega^2\right) \ldots \left(1-\frac{1}{m^2}\Omega^2\right)}{(1-\Omega^2) \ldots \left(1-\frac{1}{(m-1)^2}\Omega^2\right)}$$

(in the case of grade $(m+1)$ where $\Omega$ is equal to $$2\sqrt{L_oC_o}\frac{l}{\pi}$$

in which $l$ is a length of a lossless uniform line, $L_o$ and $C_o$ are respectively inductance and capacitance per unit length of said line. The above-mentioned spectral impedance and spectral admittance are defined, for example as follows:

In a lumped constant four terminal network, the spectral impedance $(Z_{2s})_{sp}$ and spectral admittance $(Y_{2f})_{sp}$ are defined respectively as ($\pi/2 \times$ residue number of secondary short-circuit impedance $(Z_{2s})$) and $\pi/2 \times$ residue number of one -circuit admittance $(Y_{2f})$) of said network.

CROSS-REFERENCE TO RELATED APPLICATION

This application is a continuation-in-part of prior application Ser. No. 298,149 filed on July 29, 1963 and continuation-in-part application Ser. No. 699,977 filed filed on Jan. 19, 1968, entitled "Filter Having a Low Delay Distortion Characteristic."

BACKGROUND OF THE INVENTION

In general, tangent or cotangent of phase shift $(\beta_o)$ of a lossless uniform line having flat delay characteristic is represented by the following equation.

$$\tan \beta_o l = J\frac{\pi}{2} \cdot R \cdot \frac{\Omega\left(1-\frac{1}{4}\Omega^2\right)\left(1-\frac{1}{16}\Omega^2\right)\ldots}{(1-\Omega^2)\left(1-\frac{1}{9}\Omega^2\right)\left(1-\frac{1}{25}\Omega^2\right)\ldots}$$

where R, characteristic impedance $$\sqrt{\frac{L_o}{C_o}}$$

of a lossless uniform line;

$$\Omega = 2\sqrt{L_oC_o}\, l/\pi$$

$L_o$, $C_o$ inductance and capacitance per length of line; and $l$, length of line.

The above equation is represented by infinite product with respect to $\Omega$. Accordingly, in order to realize physically a lumped constant network having flat delay characteristic within a given transmission band range, the equation should be cut off at a finite term. However, separating-away or deviation of the delay characteristic from the true flat value occurs due to the above-mentioned cutting-off. Hitherto, various systems have been proposed to compensate the deviation as described above. One of them is the system of Hester Patent (U.S. Pat. No. 2,760,167). However, the well-known systems have some disadvantages and not ideal.

SUMMARY OF THE INVENTION

An essential object of the invention is to provide an improved filter consisting of lumped constant four terminal network and having a low delay distortion and/or a low attenuation distortion, said filter being able to be composed of a simple circuit, without being accompanied by the disadvantages of the conventional like filters.

Another object of the invention is to provide an improved filter consisting of a lumped constant four terminal network and having low delay and attenuation distortions and having real frequency attenuation poles at attenuation range, said network consisting of component circuits each having the most simple form.

Said and other objects of the invention have been attained by adopting specific spectral parameters, that is, spectral impedance and admittance such as described later in detail, and by utilizing superposition method of said spectral parameters.

BRIEF DESCRIPTION OF THE DRAWINGS

FIG. 3(a) shows a voltage attenuation characteristic $\alpha_N$ and a voltage phase characteristic $\beta_N$ with respect to $\Omega$;

FIG. 3(b) and FIG. 3(c) are actual four terminal networks having a low delay distortion and designed according to principle of this invention;

FIG. 13 shows voltage attenuation characteristic $\alpha_N$ and $$\frac{\tau_N}{\tau_{N0}}$$

with respect to $\Omega$, in the example of FIG. 12.

DETAILED DESCRIPTION OF THE INVENTION

Figures 1, 2, 3, 4:
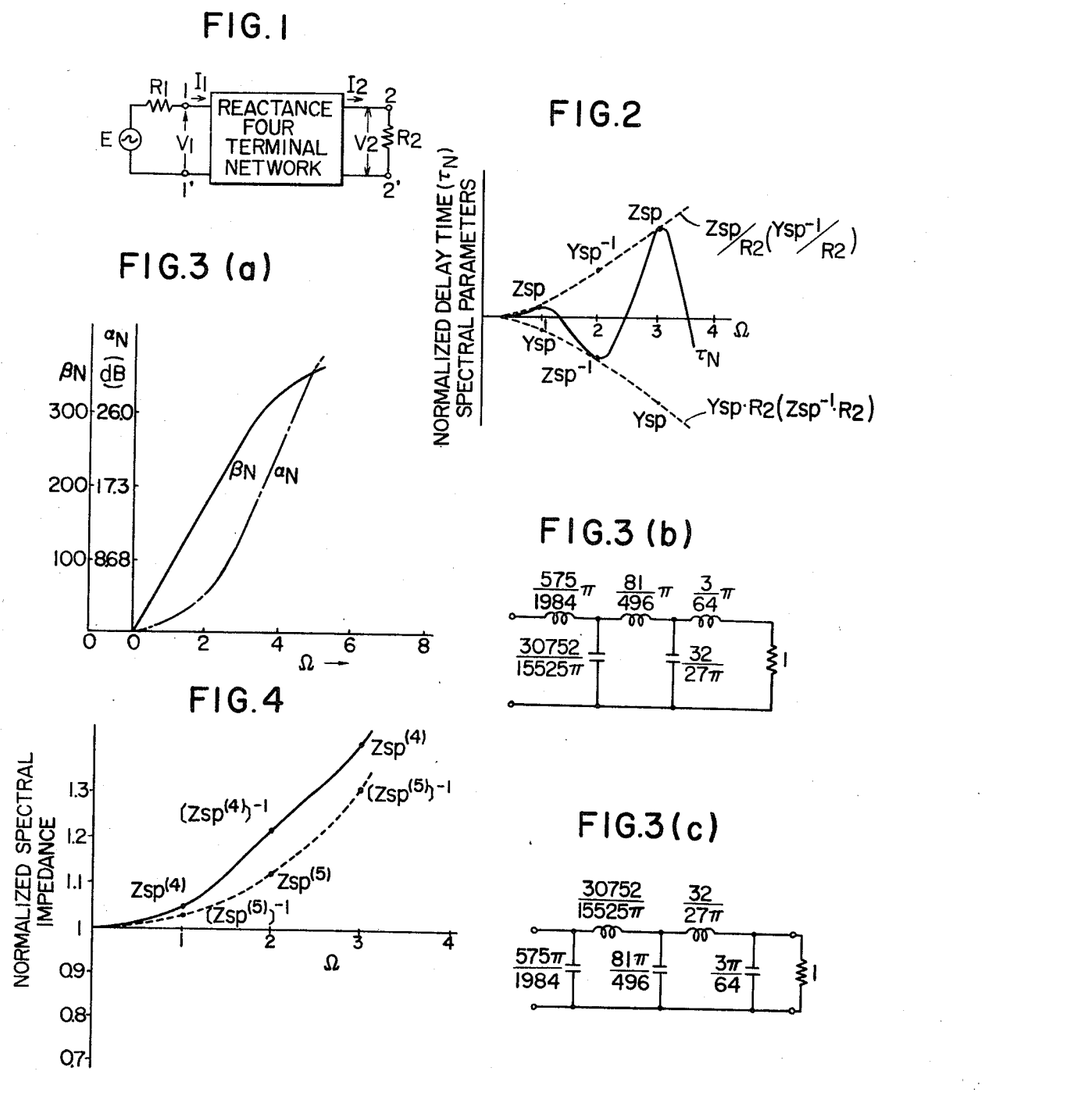
FIG. 1 is a schematic circuit diagram of a conventional four terminal network.
FIG. 2 is characteristic curves showing relations between normalized delay time ($\tau_N$), spectral parameters and $\Omega$.
FIG. 4 shows normalized spectral impedances with respect to $\Omega$.

Referring to FIG. 1, when a power voltage E having an internal resistance $R_1$ is impressed to input terminals 1–1' of a reactance four terminal network and a load resistance $R_2$ is connected to output terminals 2–2' of said network, the following transmission Equation 1 can be obtained.

$$\left. \begin{array}{l} E - I_1 R_1 = V_1 = AV_2 + BI_2 \\ I_1 = CV_2 + DI_2 \\ V_2 = I_2 R_2 \end{array} \right\} \quad (1)$$

where $V_1$, $I_1$ are respectively voltage and current in the side of the input terminals 1–1', $V_2$, $I_2$ are respectively voltage and current in the side of the output terminals 2–2', an arrow direction in the drawings being plus, A, B, C, D are four terminal constant of the reactance four terminal network, and A, D are real numbers and B, C are imaginary numbers.

If a voltage transmission factor N and a current transmission factor M are calculated from FIG. 1 and the Equation 1, the following result can be obtained:

$$\left. \begin{array}{l} N = \dfrac{V_1}{V_2} = A + B/R_2 \\ M = \dfrac{I_1}{I_2} = CR_2 + D \end{array} \right\} \quad (2)$$

Further, when the input terminals 1–1' are short-circuited or opened, and at this time the short-circuit impedance $Z_{2s}$ and the open-circuit impedance $Z_{2f}$ in the secondary side are calculated, the following result can be obtained:

$$Z_{2s}\Big|_{V_1=0} = \frac{B}{A}; \quad Z_{2f}\Big|_{I_1=0} = \frac{D}{C} \quad (3)$$

From the Equation 2, voltage phase shift $\beta_N$ and current phase shift $\beta_M$ can be obtained as follows:

$$\beta_N = \tan^{-1} \frac{B}{jAR_2}, \quad \beta_M = \tan^{-1} \frac{CR_2}{jD} \quad (4)$$

Therefore, from the Equation 3, the following result can be obtained:

$$\left. \begin{array}{l} \beta_N = \tan^{-1} \dfrac{Z_{2s}}{jR_2} = \tan^{-1} \dfrac{X_{2s}}{R_2} \\ \beta_M = \tan^{-1} \dfrac{R_2}{jZ_{2f}} = \tan^{-1} R_2 \cdot B_{2f} \end{array} \right\} \quad (5)$$

where, the following relations are taken $jX_{2s}=Z_{2s}$;

$$\frac{1}{Z_{2f}} = Y_{2f} = jB_{2f}$$

In a certain reactance four terminal network, if it is required that said network has a little delay distortion in the given pass band, that is, its delay characteristic is flat, said network should be arranged so that particular points (zero point and poles) of tan $\beta_N$, tan $\beta_M$ or cot $\beta_N$, cot $\beta_M$ of the voltage phase shift $\beta_N$ and the current phase shift $\beta_M$ in the Equation 4 or the Equation 5 may be mutually separated and so that the distance therebetween may become equal, as pointed out by Bode patent (U.S. Pat. 1,828,454) and by Hester patent (U.S. Pat. 2,760,167).

The above relationship is attributable to the facts that tangent or cotangent of phase shift $\beta_0$ of a lossless-uniform line in which the delay characteristic is flat can be represented as shown in the following Equation 6 and that the distances between poles or between zero points are respectively equivalent to $2\Omega_0$ ($\Omega_0$ is the distance between particular points, and $\Omega_0 = 1$).

$$\tan \beta_0 l = j \frac{\pi}{2} \cdot R \cdot \frac{\Omega \left(1 - \frac{1}{4}\Omega^2\right)\left(1 - \frac{1}{16}\Omega^2\right) \cdots}{(1-\Omega^2)\left(1 - \frac{1}{9}\Omega^2\right)\left(1 - \frac{1}{25}\Omega^2\right) \cdots} \quad (6)$$

where R is characteristic impedance $$\sqrt{\frac{L_0}{C_0}}; \quad \Omega = 2\sqrt{L_0 C_0} \frac{l}{\pi}$$

$L_0$, $C_0$ are inductance and capacitance per single length of the line; and $l$ is a length of line, in the lossless uniform line.

The above Equation 6 is represented by an infinite product with respect to $\Omega$. Accordingly, for the purpose of realizing physically a lumped constant network in which the delay characteristic is flat within a given transmission band, the Equation 6 must be cut off in a certain finite term.

For settling the problem such that how to compensate separating-away (or deviation) from a predetermined flat value of the delay characteristic caused by the aforementioned cutting-off, that is, how to approximate to the flat value within the transmission band, a number of inventions have been made so far.

For example, in the Hester's patent, by the Equations 24 and 25 in his patent's specification, the parameters $r$, $k$ are so selected that the sum of differential coefficients of the square value of the deviation from the flat value may come to zero within the range of the given transmission characteristic $w_1 - w_2$, that is to say, an approximation in the meaning of the minimum square is carried out.

According to the system of the Hester's patent, end portion of the given transmission band, for example, the neighbourhood of cut-off frequency in the case of a low band filter has the largest deviation, and thus it is impossible to maintain a uniform deviation (approximation of Tchebyscheff) throughout the transmission band. On the other hand, the object of the Bode's patent is to propose linearization of an image phase shift and is different in the starting point from the Hester's patent and the present invention, both carrying out linearization of voltage phase shift and current phase shift at the resistance terminal. Therefore, we will omit herewith out explanation relating to the circuit of said Bode's patent.

The present invention has the characteristic feature, different from the Hester's patent, in that by introducing spectral parameters and adopting the method of superposition, a lumped reactance four terminal network having a flat delay characteristic is realized, said spectral parameter and method of superposition being described hereinafter in detail.

Transmssion equation of a lossless-uniform line (line length $l$; phase constant $\beta_0$; inductance $L_0$; capacitance $C_0$; and characteristic impedance $$R = \sqrt{\frac{L_0}{C_0}}$$

per unit length) can be represented in the form similar to the Equation 1 as follows:

$$\left. \begin{array}{l} V_1 = \cos \beta_0 l \cdot V_2 + jR \cdot \sin \beta_0 l \cdot I_2 \\ I_1 = \frac{1}{R} \sin \beta_0 l \cdot V_2 + \cos \beta_0 l \cdot I_2 \end{array} \right\} \quad (7)$$

where $V_1$, $I_1$ are respectively voltage, current in the transmitting end, and $V_2$, $I_2$ are respectively voltage and current in the receiving end.

If the relationship of the Equations 3 and 4 is applied to the Equation 7, the following result can be obtained.

$$Z_{2s} = j \tan \beta_0 l; \frac{1}{Z_{2f}} = Y_{2f} = j\frac{1}{R} \tan \beta_0 l \quad (8)$$

Now, if placing as $$\beta_0 l = \frac{\pi}{2}\Omega$$

the following result can be obtained:

$$Z_{2s} = jR \tan \frac{\pi}{2}\Omega;\ Y_{2f} = j\frac{1}{R} \tan \frac{\pi}{2}\Omega \quad (9)$$

If a spectral impedance $(Z_{2s})_{sp}$ and a spectral admittance $(Y_{2f})_{sp}$ are defined as ($\pi/2$ residue numbers of the poles of $Z_{2s}$ and $Y_{2f}$, respectively), the residue numbers of the poles of $Z_{2s}$, $Y_{2f}$ can be obtained from the Equation 9 as follows:

$$\left( d\frac{\frac{1}{\tan \frac{\pi}{2}\Omega}}{d\Omega} \right)^{-1}_{\Omega=1,3,5\cdots} = \frac{2}{\pi} \quad (10)$$

Therefore, the following can be obtained:

$$(Z_{2s})_{sp} = R, (Y_{2f})_{sp} = \frac{1}{R} \quad (11)$$

As clear from the Equation 11, $(Z_{2s})_{sp}$ and $(Y_{2f})_{sp}$ are equal to characteristic impedance and characteristic admittance. That is to say, the spectral impedance and spectral admittance of a lossless-uniform line having no delay distortion have the nature to coincide with the characteristic impedance. The Equation 11 is established on the grounds that in the Equations 6 and 9, the distance between these particular points is equidistance and that these equations are represented by infinite product with respect to $\Omega$. Accordingly, if the Equation 6 is cut off in the finite term, the Equation 11 is not established and then has deviation.

Now, we will try to study cause and effect between value of deviation of the spectral impedance $(Z_{2s})_{sp}$ and admittance $(Y_{2f})_{sp}$ from $R$, $1/R$, and value of deviation of the delay characteristic from a predetermined value (flat value).

Assuming that the network in FIG. 1 is the lumped constant network, if, for example, the voltage phase characteristic is considered, there is a relationship $$\left(\tau_N = \frac{d\beta_N}{d\Omega}\right)$$

between the delay characteristic $\tau_N$ and differential coefficients of the phase characteristic $\beta_N$, and $\Omega$, and in view of the fact that in the vicinity of the zero point, $$\tan \frac{\pi}{2} \doteq \frac{\pi}{2}\Omega$$

the following relationship is obtained.

$$\frac{\tau_N}{\tau_{ON}} = \frac{(Z_{2s})_{sp}}{R_2} \quad (12)$$

where $\tau_{ON}$ is a normalized constant value of the delay characteristic.

Further, in the vicinity of the pole of $Z_{2s}$, there is the following relationship:

$$\frac{\tau_N}{\tau_{ON}} = \frac{R_2}{(Z_{2s})_{sp}} \quad (13)$$

Therefore, the Equations 12 and 13 indicate respectively that ratio of the normalized value $\tau_{ON}$ of the delay characteristic and the actual delay characteristic $\tau_N$ is equal to the ratio of the spectral impedance $(Z_{2s})_{sp}$ and the load resistance $(R_2)$ in its network.

On the other hand, from the Equations 5 and 11 in which it is assumed that $R = R_2$, the following equations are obtained:

$$(Z_{2s})_{sp} = Z_{2s} \times \cot \frac{\pi}{2}\Omega; \ \beta_N = \tan^{-1}\left(\frac{(Z_{2s})_{sp}}{R_2} \tan \frac{\pi}{2}\Omega\right) \quad (14)$$

Therefore, the following equation can be obtained.

$$\tau_N \doteq \tau_{ON} \frac{1 + \tan^2 \frac{\pi}{2}\Omega}{R_2 \left[\frac{1}{Z_{2s}}\right]_{sp} + \frac{\tan^2 \frac{\pi}{2}\Omega}{R_2 \left[\frac{1}{Z_{2s}}\right]_{sp}}} \quad (15)$$

Accordingly, the following is established;

$$\frac{[Z_{2s}]_{sp}}{R_2} \geqq \frac{\tau_{ON}}{\tau_N} \geqq \frac{R_2}{[Z_{2s}]_{sp}} \quad (16)$$

and value of the normalized delay characteristic $\tau_{ON}/\tau_N$ oscillates between the normalized spectral impedance $[Z_{2s}]_{sp}/R_2$ and admittance $$\frac{R_2}{(Z_{2s})_{sp}}$$

As will be seen from the above fact, according to the present invention, it is possible to realize the network having a low delay distortion within a given transmission band by approximating the spectral impedance $[Z_{2s}]_{sp}$ or the spectral admittance $[Y_{2f}]_{sp}$ of said network to the terminal resistance $R_2$.

FIG. 2 shows a relationship of the Equation 16 and more particularly illustrates the view to the effect that the delay characteristic $\tau_N$ oscillates between the spectral impedance $Z_{sp}$ and the spectral admittance $Y_{sp}$. The delay characteristic of FIG. 2 corresponds to the case where the voltage phase characteristic $\beta_N$ has the relationship represented by the following equation:

$$\tan \beta_N = jZ_{2s}^{(5)\prime} = j\frac{\pi}{2} \cdot \frac{\Omega\left(1 - \frac{1}{4}\Omega^2\right)\left(1 - \frac{1}{24}\Omega^2\right)}{(1-\Omega^2)\left(1 - \frac{1}{9}\Omega^2\right)} \quad (17\text{-}1)$$

and the voltage attenuation characteristic $\alpha_N$ can be given by the following Equation 18–1.

$$\alpha_N = 20\log_{10}|A+jB| = 20\log\left|(1-\Omega^2)\left(1-\frac{1}{9}\Omega^2\right)\right.$$
$$\left. +j\frac{\pi}{2}\Omega\left(1-\frac{1}{4}\Omega^2\right)\left(1-\frac{1}{24}\Omega^2\right)\right| \text{(db)}$$
(18–1)

(Note: In the following explanation, let it be assumed that $R_2=1$; and meaning of the symbol $$Z_{2s}^{(5)'}$$

will be described in the later paragraph.)

FIG. 3(a) represents the characteristic $\alpha_N$ and $\beta_N$ in the above case. Formation of a four terminal lumped constant reactants network having the voltage-phase characteristic $\beta_N$ represented by the Equation 17–1 and the voltage attenuation characteristic $\alpha_N$ represented by the Equation 18–1 can be realized according to the following method:

$$Z_{2s}^{(5)'}$$

in the Equation 17–1 corresponds to secondary short-circuit impedance as clear from the Equation 3 and FIG. 1, and $\alpha_N$ in the Equation 18–1 exists at the position where attenuation pole frequency (at this frequency, attenuation becomes infinite) corresponds to infinite frequency ($\Omega=\infty$ as clear from the Equation 18–1). Formation of a reactance four terminal network having the above-mentioned $$\beta_N(=Z_{2s}^{(5)'})$$

and $\alpha_N$ can be realized as follows.

If in the Equation 17–1, $j\Omega$ is put to be equal to P (P is denoted as complex angular frequency) and converted, the following Equation 17–2 is obtained.

$$Z_{2s}^{(5)'} = \frac{\pi}{2}\cdot\frac{9}{4\times 24}\cdot\frac{P(P^4+28P^2+96)}{P^4+10P^2\times 9} \quad (17-2)$$

In the Equation 17–2, if P is approached to $\infty$, $$Z_{2s}^{(5)'}$$

approaches gradually to $$\left(\frac{\pi}{2}\cdot\frac{9}{4\times 24}P\right)$$

whereby the secondary short-circuit impedance $$Z_{2s}^{(5)'}$$

in FIG. 1 becomes an inductance ($L_1$) having a value of $$\frac{\pi}{2}\cdot\frac{9}{4\times 24}$$

in its series arm. This fact can be represented by the following equation.

$$L_1 = \frac{Z_{2s}^{(5)'}}{P}\bigg|_{P\to\infty} = \frac{\pi}{2}\cdot\frac{9}{4\times 24} = \frac{3\pi}{64}$$

The reason of adopting the condition ($P\to\infty$) resides in that attenuation poles of $\alpha_N$ represented by the Equation 18–1 exist at only the positions corresponding to infinite frequencies.

The remained impedance $$Z_{2s}^{(5)''}$$

obtained by subtracting $L_1$ from $$Z_{2s}^{(5)'}$$

is represented by the following equation.

$$Z_{2s}^{(5)''} = Z_{2s}^{(5)'} - L_1 P = \frac{3\pi}{64}\cdot\frac{P(18P^2+87)}{P^4+10P^2+9}$$

In this equation, maximum power number of P is lower by one grade than that of $$Z_{2s}^{(5)'}$$

and power number of the denominator is higher by one grade than that of the numerator. Accordingly, since if the condition ($P\to\infty$) is adopted in $$Z_{2s}^{(5)''}, Z_{2s}^{(5)''} \text{ becomes zero}$$

impedance of the shunt arm should be a capacitance $C_2$ in order to make $$Z_{2s}^{(5)''}$$

correspond to the attenuation poles of $\alpha_N$ in the Equation 18–1. The value of the capacitance $C_2$ can be calculated from admittance in the same manner as in the case where $L_1$ is calculated from impedance. That is;

$$C_2 = \frac{\frac{1}{Z_{2s}^{(5)''}}}{P}\bigg|_{P\to\infty} = \frac{64}{3\pi\times 18} = \frac{32}{27\pi}$$

The remained admittance $$\frac{1}{Z_{2s}^{(5)'''}}$$

obtained by subtracting $C_2$ from $$\frac{1}{Z_{2s}^{(5)''}}$$

is represented by the following equation.

$$\frac{1}{Z_{2s}^{(5)'''}} = \frac{32}{27\pi}\times\frac{93P^2+18\times 18}{P(18P^2+87)}$$

Maximum power number of P in $$\frac{1}{Z_{2s}^{(5)'''}}$$

is lower by a further one grade than that of $$\frac{1}{Z_{2s}^{(5)''}}$$

and becomes third power, and power number of the denominator is higher by one grade than that of the numerator.

$$\frac{1}{Z_{2s}^{(5)'''}}$$

becomes zero at the condition ($P\to\infty$), so that according to the same reason as described already in connection with the Equation 17–2, $$Z_{2s}^{(5)'''}$$

should correspond to an inductance $L_3$ of the series arm.

$$L_3 = \frac{Z_{2s}^{(5)'''}}{P}\bigg|_{P\to\infty} = \frac{81\pi}{49b}$$

Power number of P of the remained impedance $$Z_{2s}^{(5)''''}$$

obtained by subtracting $L_3\cdot P$ from $$Z_{2s}^{(5)'''}$$

becomes lower by one grade than that of the impedance $$Z_{2s}^{(5)'''}$$

If capacitance $C_4$ of the shunt arm is calculated from $$\frac{1}{Z_{2s}^{(5)''''}}$$

and the above-mentioned method is repeated, the following results are obtained.

$$Z_{2s}^{(5)'''''} = \frac{15525\pi}{30752}\cdot\frac{P}{\left(P^2+\frac{992\times 621}{23\times 15371}\right)}$$

$$\therefore C_4 = \frac{30752}{15525\pi} \quad L_5 = \frac{575\pi}{1984}$$

Thus, a lumped reactance four terminal network having $\alpha_N$ and $\beta_N$ as shown in FIG. 3(a), which operates under the condition such that input voltage=$V_1$; output voltage=$V'_2$; and load resistance R=1 ohm, can be formed by ladder circuit network such as shown in FIG. 3(b).

If the Equation 17-1 corresponds to the current phase characteristic $\beta_M$, tan $\beta_M$ can be represented from the Equations 4 and 5 as follows.

$$\tan \beta_M = \frac{C(j\Omega)}{D(j\Omega)} = jY_{2s}^{(5)'} = j\frac{\pi}{2} \cdot \frac{\Omega\left(1-\frac{1}{4}\Omega^2\right)\left(1-\frac{1}{24}\Omega^2\right)}{(1-\Omega^2)\left(1-\frac{1}{9}\Omega^2\right)}$$

(17-3)

In this case, the current attenuation characteristic $\alpha_M$ is represented by the following equation.

$$\alpha_M = 20 \cdot \log_{10}|D+jC|$$

$$= 20 \cdot \log_{10}\left|(1-\Omega^2)\left(1-\frac{1}{9}\Omega^2\right) + j\frac{\pi}{2}\Omega\left(1-\frac{1}{4}\Omega^2\right)\left(1-\frac{1}{24}\Omega^2\right)\right|$$

(18-2)

The above obtained factors $\beta_M$ and $\alpha_M$ are coincident with $\beta_N$ and $\alpha_N$ shown in FIG. 3(a). Circuit elements therefor can be obtained by substituting the impedance $$Z_{2s}^{(5)'}$$

for the admittance $$(Y_{2s}^{(5)'})$$

and by adopting the same method as in the case of forming the network shown in FIG. 3(b). In this case, values of the series arm inductance and shunt arm capacitance in the network of FIG. 3(b) correspond, respectively, to values of the shunt arm capacitance and series arm inductance, whereby a ladder circuit network as shown in FIG. 3(c) can be obtained.

Conversion of the networks shown in FIG. 3(b) and FIG. 3(c) into practically usable circuit structures, for example, realization of a low pass filter in which $R_2$=600 ohms and pass band=1000 Hz. ($\alpha_N$ or $\alpha_M$=3 db) can be attained as follows. Let it be assumed that the network of FIG. 3(b) is considered. Then, from $\alpha_N$ of FIG. 3(a), $\Omega$ corresponding to 3 db becomes 1.8. Accordingly, if a condition ($\Omega$=1.8) is made to correspond to an angular frequency ($w=2\pi \times 1000$), $\Omega$=1 corresponds to the reference cut-off angular frequency ($w_c=2\pi \times 555$), whereby values of the circuit elements become as follows.

$$L_1 = \frac{3\pi}{64} \cdot \frac{600}{2\pi \times 555} \text{ (henry)}$$

$$C_2 = \frac{32}{27\pi} \cdot \frac{1}{2\pi \times 555 \times 600} \text{ (farad)}$$

$$L_3 = \frac{81}{496}\pi \cdot \frac{600}{2\pi \times 555} \text{ (henry)}$$

$$L_5 = \frac{575\pi}{1984} \cdot \frac{600}{2\pi \times 555} \text{ (henry)}$$

$$C_4 = \frac{30752}{15525\pi} \cdot \frac{1}{2\pi \times 555 \times 600} \text{ (farad)}$$

Nextly, referring to the means for compensating deviation of the delay characteristic from the normalized value $\tau_{ON}$, said deviation being caused by cutting off infinite product regarding $\Omega$ in the Equation 6 at a finite term, the characteristic feature of the present invention will be stated hereinafter by taking up the Equation 17-1 as an example.

If the Equation 6 is cut off at the fourth power which is the maximum power number of $\Omega$ (the maximum power number is shown by the number in the right upper part of $Z_{2s}$), the following equation is obtained:

$$jZ_{2s}^{(4)} = j\frac{\pi}{2} \cdot \frac{\Omega\left(1-\frac{1}{4}\Omega^2\right)}{(1-\Omega^2)\left(1-\frac{1}{9}\Omega^2\right)} \quad (19)$$

If said Equation 6 is cut off at the fifth power which is the maximum power number of $\Omega$, the following equation is obtained:

$$jZ_{2s}^{(5)} = j\frac{\pi}{2} \cdot \frac{\Omega\left(1-\frac{1}{4}\Omega^2\right)\left(1-\frac{1}{16}\Omega^2\right)}{(1-\Omega^2)\left(1-\frac{1}{9}\Omega^2\right)} \quad (20)$$

When calculating the spectral impedance of the Equations 19 and 20, characteristics as shown in FIG. 4 can be obtained. In FIG. 4, the deviation direction from the normalized value ($R_2$) of $$[Z_{2s}^{(4)}]$$

and $$[Z_{2s}^{(5)}]_{sp}$$

is opposite with each other, and it will be seen that deviation of the term having higher power number is smaller than the term having lower power number.

Accordingly, when a new two terminal impedance $$Z_{2s}^{(5)'}$$

in the Equation 17-1 is formed by adding $$Z_{2s}^{(4)}$$

and $$Z_{2s}^{(5)}$$

at a certain ratio, it may be possible to decrease deviation of the spectral impedance $$[Z_{2s}^{(5)'}]_{sp}$$

from the normalized value than those of $$[Z_{2s}^{(4)}]_{sp}$$

and $$[Z_{2s}^{(5)}]_{sp}$$

The present invention has been paid attention to the above point, and it will be clear that the spectral impedance $$[Z_{2s}^{(5)'}]_{sp}$$

of the Equation 17-1 represented by the following equation:

$$Z_{2s}^{(5)'} = \left[Z_{2s}^{(4)} \times \frac{1}{3} + Z_{2s}^{(5)} \times \frac{2}{3}\right] \quad (21)$$

is better than $$[Z_{2s}^{(4)}]_{sp}, [Z_{2s}^{(5)}]_{sp}$$

in FIG. 4, as shown in FIG. 2. Such a technique is called "superposition," which is fundamentally different from the Hester's invention. Superposition ratio in the Equation 21 is 1:2, but said ratio varies in accordance with high and low rank of power number. The most appropriate ratio varies along the same characteristic curve as FIG. 4 in accordance with power rank, so that said appropriate ratio can be obtained from said characteristic curve.

Another example adapted to prove the effectiveness of the "superposition" will be described in the following.

Figure 5:
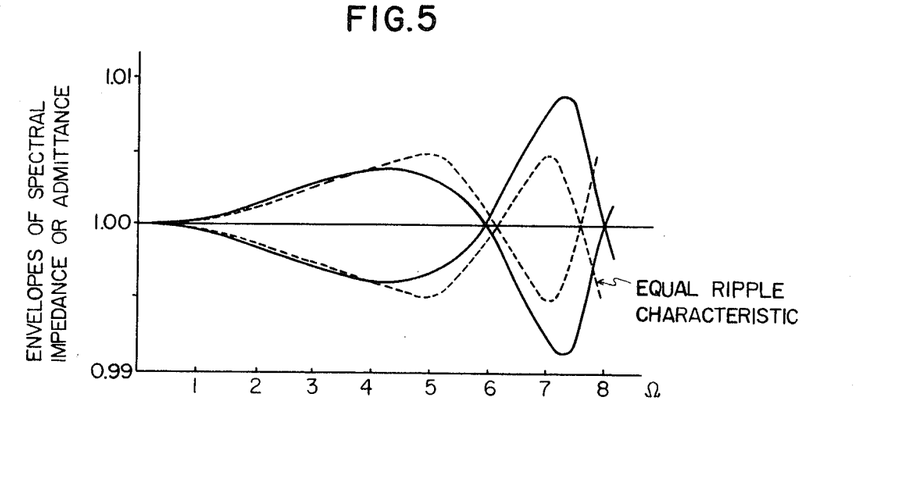
FIG. 5 shows envelopes of spectral impedance and admittance with respect to $\Omega$.

In the case of cutting-off the Equation 6 at the ninth power which is the maximum power number of said equation and carrying out twice the superposition, the following equation is obtained:

$$jZ_{2a}^{(9)'} = j\frac{\pi}{2}\Omega \cdot \frac{\left(1-\frac{1}{4}\Omega^2\right)\left(1-\frac{1}{16}\Omega^2\right)\left(1-\frac{1}{36}\Omega^2\right)\left(1-\frac{1}{64}\Omega^2\right)}{(1-\Omega^2)\left(1-\frac{1}{9}\Omega^2\right)\left(1-\frac{1}{25}\Omega^2\right)\left(1-\frac{1}{49}\Omega^2\right)} \times \frac{1-b\Omega^2}{1-a\Omega^2} \quad (22)$$

in which a factor of $$\frac{1-b\Omega^2}{1-a\Omega^2}$$

is multiplied. In the Equation 22, if $a$ and $b$ are determined so that $$[Z_{2a}^{(9)'}]_{sp} = 1$$

is established at each point of $\Omega = \pm 6$ and $\pm 8$, the spectral impedance $$[Z_{2a}^{(9)'}]_{sp}$$

affords the characteristic as shown with a full line in FIG. 5.

The dotted line of FIG. 5 shows the case in which $\Omega = \pm 6.2$, $\Omega = \pm 7.6$ and $$[Z_{2a}^{(9)'}]_{sp} = 1$$

FIG. 5 relates to the case in which the envelope of the delay characteristic is made substantially to equal ripple (Chebyscheff, approximately).

It is the means for approximating at the best condition the spectral impedance and spectral admittance to the terminal resistance ($R_2$) to carry out the superposition for several times, which means is just similar to the induction-M-conversion of an image impedance in the theory of image parameter filter.

That is to say, in addition to $$\frac{1-b\Omega^2}{1-a\Omega^2}$$

of the Equation 22, the following factors can be used:

$$\frac{1-b\Omega^2}{(1-a\Omega^2)(1-c\Omega^2)}; \frac{(1-b\Omega^2)(1-d\Omega^2)}{(1-a\Omega^2)(1-c\Omega^2)} \quad (23)$$

In the above-mentioned explanation, we have clarified the following facts (A) and (B) in connection with simple examples, in which the attenuation characteristic $\alpha_N$ or $\alpha_M$ is increased in a simple manner, that is, all the attenuation poles exist at, infinite frequency range.

(A) Relationships between the delay characteristic and spectral impedance, spectral admittance.
(B) The fact that the superposing method is effective as the means for minimizing the deviation of the delay characteristic from the normalized value at a given transmission band.

In the following, circuit structures of filters each having a low delay distortion, in which the attenuation characteristic is converted to a complex form, will be described.

Now, we explain a circuit structure of a filter having a low delay distortion and formed according to the principle of the present invention.

Since the voltage transmission coefficient N (the current transmission coefficient M has the relative relationship with N, so that the explanation will be made about only N) can be given by the Equation 2, where $R_2$ is assumed to be 1, that is $R_2=1$, and the voltage attenuation characteristic $\alpha_N$ and the voltage phase characteristic $\beta_N$ can be represented by the following equation:

$$\alpha_N = 20 \cdot \log|A+B| \, (dB)$$

$$\tan \beta_N = \frac{B}{A} \quad (24)$$

Accordingly, when A and B are multiplied by a common factor, $\tan \beta_N$ is constant, but $\alpha_N$ is changed. In other words, by determining said common factor suitably, it is possible to decrease the delay distortion by the aforementioned method, thereby to compensate the attenuation characteristic, the detailed explanation of which will be made in the following:

If the admittance matrix of the reactance four terminal network in FIG. 1 is represenated as $$\begin{bmatrix} Y_{11} & Y_{12} \\ Y_{12} & Y_{22} \end{bmatrix} \quad (25)$$

the following equations are represented by a polynominal of $\Omega$:

$$Y_{22} = \frac{A(j\Omega)}{B(j\Omega)} = \sum_{\nu=0}^{l-1} \frac{j2k_{22}^{(\nu)}\Omega}{\alpha_\nu^2 - \Omega^2}$$

$$Y_{12} = \frac{A(0)}{B(j\Omega)} = \sum_{\nu=0}^{l-1} \frac{j2k_{12}^{(\nu)}\Omega}{\alpha_\nu^2 - \Omega^2}$$

$$Y_{11} = \frac{D(j\Omega)}{B(j\Omega)} = \sum_{\nu=0}^{l-1} \frac{j2k_{11}^{(\nu)}\Omega}{\alpha_\nu^2 - \Omega^2} \quad (26)$$

where $l$ is a maximum power number and equal to power rank of the circuit network, and $$k_{11}^{(\nu)}, k_{12}^{(\nu)} \text{ and } k_{22}^{(\nu)}$$

are residue numbers of poles $\alpha_\nu$ of component admittance matrix sections.

Attenuation poles correspond to the root in the numerator of $Y_{12}$ and $A(0)$ in the numerator of $Y_{12}$ of the Equation 26 indicates the form in the case of having no attenuation poles except at positions where $\Omega = \pm \infty$.

If the attenuation poles are put as $\Omega = \pm \Omega a, \pm \Omega b \ldots$, $Y_{12}$ can be indicated as follows:

$$Y_{12} = \frac{A(0)\left(1-\frac{\Omega^2}{\Omega_a^2}\right)\left(1-\frac{\Omega^2}{\Omega_b^2}\right)\cdots}{B(j\Omega)} \quad (27)$$

If the afore-mentioned common factor is given as $Q(j\Omega)$, the following equations can be obtained from the Equation 25.

$$A_1 = \frac{A(j\Omega)}{Q(j\Omega)\left(1-\frac{\Omega^2}{\Omega_a^2}\right)\left(1-\frac{\Omega_2}{\Omega_b^2}\right)}$$

$$B_1 = \frac{B(j\Omega)}{Q(j\Omega)\left(1-\frac{\Omega^2}{\Omega_a^2}\right)\left(1-\frac{\Omega^2}{\Omega_b^2}\right)} \quad (28)$$

By substituting the above for the Equation 24, the following equation is obtained:

$$\alpha_N = 20 \cdot \log \left| \frac{\sqrt{(A(j\Omega))^2 + (B(j\Omega))^2}}{P(j\Omega)\left(1-\frac{\Omega^2}{\Omega_a^2}\right)\left(1-\frac{\Omega_2}{\Omega_b^2}\right)} \right| \quad (29)$$

where, such a form as set forth below is taken:

$$Q(j\Omega) = 1 + a_2\Omega^2 + a_4\Omega^4 \ldots + a_2\Omega^{2n} \quad (30)$$

For the purpose of improving the attenuation distortion within a predetermined pass band, in the case of satisfying the following equations at $m$ points in the pass band, $$\alpha_N = 0, \frac{d\alpha_N}{d\Omega} = 0 \quad (31)$$

$Q(j\Omega)$ must satisfy the condition of $2m$ numbers, that is, $n$ must be equal at least to $2m$.

If $n$ is an odd number, the following condition is added in addition to the above Equation 31.

$$\left[\frac{d^2\alpha_N}{d\Omega^2}\right]_{\Omega=0} \quad (32)$$

A filter having a low delay distortion and a voltage attenuation characteristic $\alpha_N$ (or current attenuation characteristic $\alpha_M$) represented by the Equation 29, in which coefficients $a_2, a_4 \ldots a_{2n}$ of $Q(j\Omega)$ in the Equation 30 have been determined from the condition Equations 31 and 32 by giving the attenuation poles $\Omega_a$ and $\Omega_b$, can be formed from the admittance matrices in the Equations 25 and 26. Practical illustrative formations of filters of the above type will be described as follows.

Figure 7:
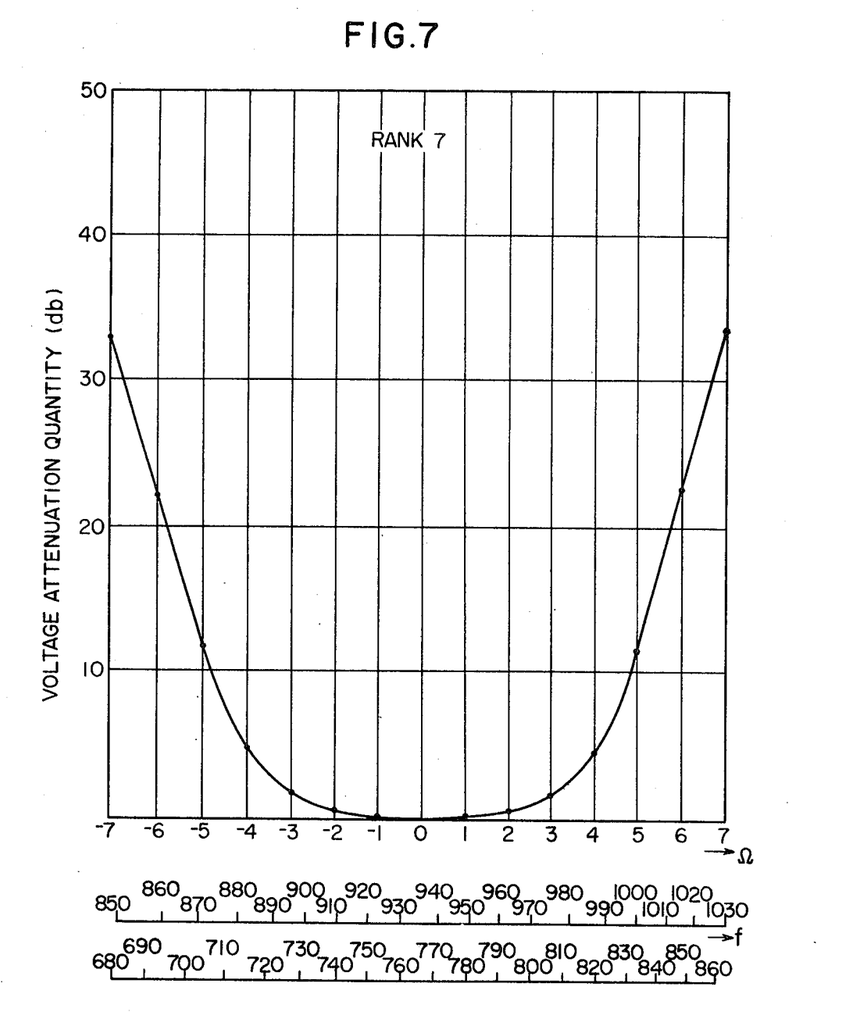
FIG. 7 shows voltage attenuation characteristic $\alpha_N$ (db) of a network according to the present invention, with respect to $\Omega$ and $f$, in the case of rank 7.

Firstly, formation of a band pass filter having a low delay distortion, in which all of the attenuation poles of the attenuation characteristic exist at infinite frequencies as in the case of the above-mentioned examples and the attenuation distortion is made to be flat characteristic having a low attenuation distortion within a pass band range, will be described. This example relates to a channel filter having the attenuation characteristic as shown in FIG. 7 and adopted for 100 band F.S. telegraph apparatus under manufacture by the Japanese Kokusai Denshin Denwa K.K. In this example, since all of the attenuation poles are infinite, all of the factors $\Omega_a, \Omega_b \ldots$ in the Equation 27 become infinite and $A_1$ and $B_1$ in the Equation 28 becomes as follows.

$$A_1 = \frac{A(j\Omega)}{Q(j\Omega)}; \quad B_1 = \frac{B(j\Omega)}{Q(j\Omega)} \quad (33)$$

If let it be assumed that the secondary short-circuit impedance $Z_{2s}$ corresponds to the case where maximum power number is 7, that is, rank 7, the voltage phase characteristic $\beta_N$ is represented by the following equation.

$$\beta_N = \tan^{-1} Z_{2s}^{(7)\prime}$$
$$= \tan^{-1} \frac{\pi}{2} \cdot \frac{\Omega\left(1 - \frac{1}{4}\Omega^2\right)\left(1 - \frac{1}{6}\Omega^2\right)\left(1 - \frac{1}{54}\Omega^2\right)}{(1-\Omega^2)\left(1 - \frac{1}{9}\Omega^2\right)\left(1 - \frac{1}{25}\Omega^2\right)} R_2 \quad (34)$$

The Equation 34 is obtained by superposing
$$Z_{2s}^{(6)}$$
and
$$Z_{2s}^{(7)}$$
at a ratio of
$$\frac{Z_{2s}^{(6)}}{Z_{2s}^{(7)}} = \frac{1}{2}$$

Figure 6:
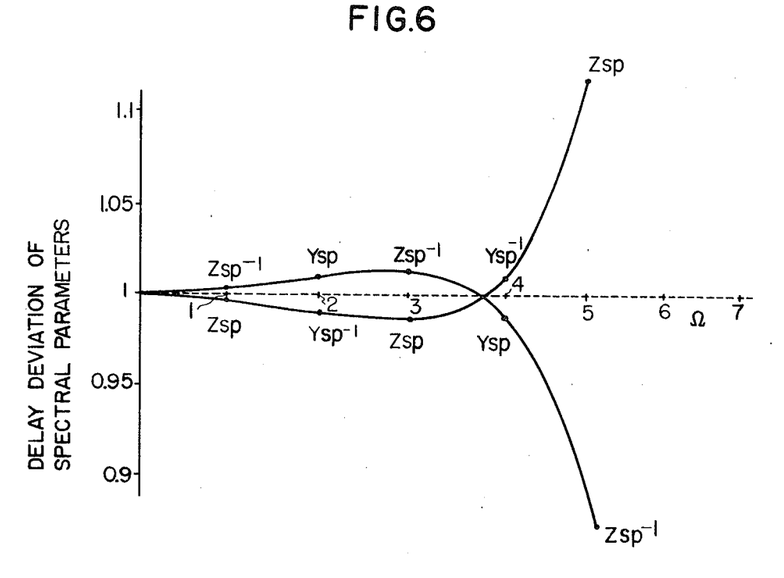
FIG. 6 shows characteristic curves showing relations between the spectral parameters and $\Omega$, said curves being necessary for describing an advantage according to adoption of the spectral parameters.

In this case, delay deflection of the spectral impedance
$$[Z_{2s}^{(7)\prime}]_{sp}$$
is less than 2% within the range $\Omega < 4$, as shown in FIG. 6. In this example, circuit constants A and B are obtained from the Equation 34, as follows.

$$A = (1-\Omega^2)\left(1 - \frac{1}{9}\Omega^2\right)\left(1 - \frac{1}{25}\Omega^2\right)$$
$$B = j\frac{\pi}{2}\Omega\left(1 - \frac{1}{4}\Omega^2\right)\left(\phantom{1} - \frac{1}{16}\Omega^2\right)\left(1 - \frac{1}{54}\Omega^2\right) \quad (35)$$

If $Q(j\Omega)$ of the Equation 30 is selected so as to satisfy the following condition $$Q(j\Omega) = (1 + a_0\Omega^2)$$

then the Equation 33 is represented by the following Equation 36

$$A_1 = \frac{1}{1+a_0\Omega^2}; \quad B_1 = \frac{1}{1+a_0\Omega^2} \quad (36)$$

The voltage attenuation quantity $\alpha_N$ is obtained from the Equation 29 represented by the following equation.

$$\alpha_N = 20 \log_{10} \left| \frac{\sqrt{(A(j\Omega))^2 + (B(j\Omega))^2}}{1+a_0\Omega^2} \right| \quad (37)$$
$$(db)$$

The unknown factor $a_0$ can be calculated from the condition Equations 31 and 32, but in this example the attenuation characteristic is a simple increase characteristic, so that value of $a$ should be selected in such a manner that $\alpha_N$ of the Equation 37 is expanded within the range of $\Omega \leq 1$ so as to satisfy the condition $$\left(\left[\frac{d\alpha_N}{d\Omega^2}\right]_{\Omega=0} = 0\right)$$

and coefficient of $\Omega^2$ is made to be zero.

(The Equations 31 and 32 are used in the following example.)

$$a = \frac{\pi^2}{8} - \left(1 + \frac{1}{9} + \frac{1}{25}\right) = 0.082589 \ldots \doteq 0.08259 \quad (38)$$

Accordingly, the Equation 36 becomes as follows.

$$\left.\begin{array}{l} A_1 = \dfrac{(1-\Omega^2)\left(1 - \frac{1}{9}\Omega^2\right)\left(1 - \frac{1}{25}\Omega^2\right)}{(1+0.08259\Omega^2)} \\[2ex] B_1 = j\dfrac{\pi}{2}\cdot\dfrac{\Omega\left(1 - \frac{1}{4}\Omega^2\right)\left(1 - \frac{1}{16}\Omega^2\right)\left(1 - \frac{1}{54}\Omega^2\right)}{(1+0.08259\Omega^2)} \end{array}\right\} \quad (39)$$

In the Equation 39, the fact that denominators of $A_1$ and $B_1$ have the factor of $(1+0.08259\Omega^2)$ means that imaginary frequency attenuation poles are included at $\Omega \doteq \pm j3.48$.

From the Equations 34 and 39, a circuit network having imaginary frequency attenuation poles at $\Omega = \pm j3.48$ and having secondary short-circuit impedance
$$Z_{2s}^{(7)\prime}$$
can be formed according to the following manner. In the case of realizing the attenuation poles in a lattice circuit network, this realization can be attained by inserting a series circuit element consisting of an inductance L and a capacitance C into a shunt arm or by inserting a parallel circuit element consisting of said inductance L and capacitance C into a series arm.

The following example relates to the case in which shunt arm including the series circuit element is adopted.
$$Z_{2s}^{(7)\prime}$$
in the Equation 34 becomes infinite at $\Omega = \infty$, so that inductance $L_{5n}$ exists in the series arm as in the case of the afore-mentioned example. Furthermore, since L, C series circuit element of the shunt arm is short-circuited at the condition $\Omega = \pm j3.48$, the following results is obtained.

$$[Z_{2s}^{(7)}]_\Omega = \pm j3.48 = 0$$

From the above fact, value of the series arm inductance $L_{5n}$ is represented by the following equation.

$$L_{5n} = \left.\frac{Z_{2s}^{(7)\prime}}{j\Omega}\right|_{\Omega^2 = -3.48^2} = 0.2981 R_2$$

Power number of the
$$Z_{2s}^{(7)\prime\prime}$$
obtained by removing $j\Omega L_1$ from
$$Z_{2s}^{(7)\prime}$$
is 6 rank and value of
$$Z_{2s}^{(7)\prime\prime}$$
becomes zero at the condition $\Omega = \pm j3.48$. That is
$$\frac{1}{Z_{2s}^{(7)\prime\prime}}$$
includes a factor such as $(\Omega^2 + 3.48^2)$. As a result, inductance $L_{4n}$ of the shunt arm becomes a negative inductance such as represented by the following equation.

$$\frac{1}{L_{4n}} = \left.\frac{(\Omega^2 + 3.48^2)}{j\Omega} \cdot \frac{1}{Z_{2s}^{(7)\prime\prime}}\right|_{\Omega^2 = -3.48^2} = -\frac{1}{0.1365}$$

Figure 8:
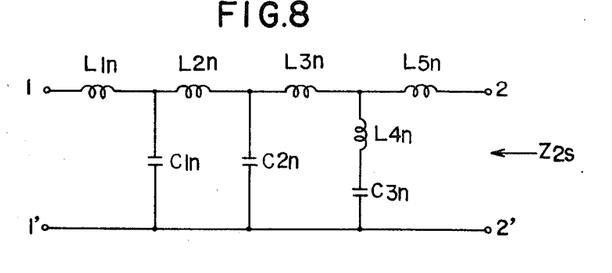
FIG. 8 shows a circuit connection diagram of a network forming a low pass filter formed according to the present invention.

Nextly, the remained admittance
$$\frac{1}{Z_{2s}^{(7)\prime\prime}}$$

obtained by removing $$\frac{j\Omega}{L_{4n}(\Omega^2+3.48^2)}$$

from $$\frac{1}{Z_{2s}^{(7)''}}$$

cannot has attenuation poles at finite angular frequencies, but at infinite angular frequencies, so that series inductances and parallel capacitances can be calculated successively as in the same manner as the afore-mentioned example. Thus, a low pass filter consisting of the network as shown in FIG. 8 is obtained. Various values obtained as above are indicated as follows.

$$\left.\begin{array}{ll} L_{1n}=0.4578R_2 & C_{1n}=0.4363R_2{}^{-1} \\ L_{2n}=0.3640R_2 & C_{2n}=0.3216R_2{}^{-1} \\ L_{3n}=0.4509R_2 & C_{3n}=\frac{1}{L_{4n}x(-3.48)^2} \\ L_{4n}=0.1365R_2 & \phantom{C_{3n}}=0.6048R_2{}^{-1} \\ L_{5n}=0.2981R_2 & \end{array}\right\} \quad (40)$$

The above filter can be converted to a band pass filter by carrying out the following well-known frequency conversion.

$$\Omega=\frac{\omega^2-\omega_1\omega_2}{(\omega_2-\omega_1)\omega} \quad (41)$$

where $\omega_1$ and $\omega_2$ are, respectively, lower and upper reference cut-off angular frequencies and $\omega_2>\omega_1$. When conversion of the Equation 41 is to be carried out, $L_{1n}-L_{5n}$ and $C_{1n}-C_{3n}$ in the $\Omega$ region are converted to series circuit element and parallel circuit element of L and C in the region. However, since $L_{4n}$ is a negative inductance, a negative element exists in the band pass filter elements, so that the filter cannot be practically used.

Figure 9:
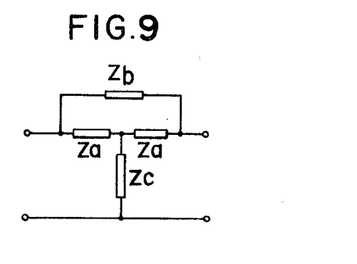
FIG. 9 is a schematic connection diagram of a bridge T type low pass filter according to the present invention.
Figure 10A:
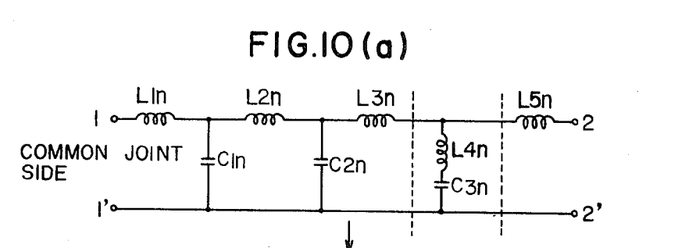
FIGS. 10(a)–(f) and FIG. 11 show various circuit connection diagrams for obtaining positive band pass filter according to this invention.
Figure 10B:
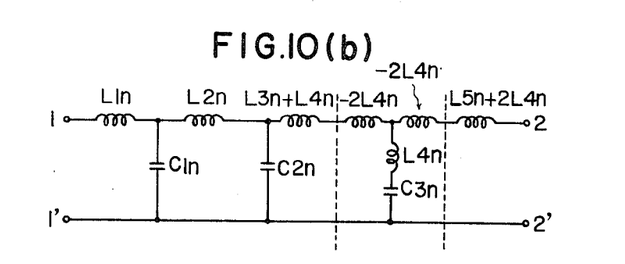
Figure 10C:
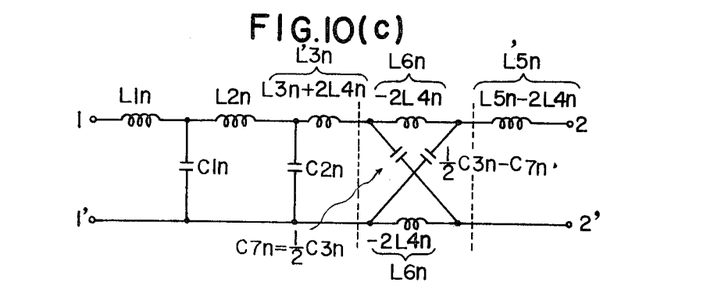
Figure 10D:
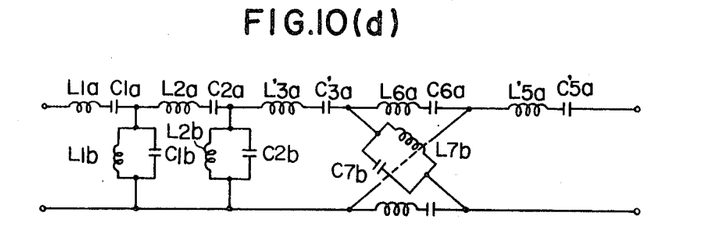
Figure 10E:
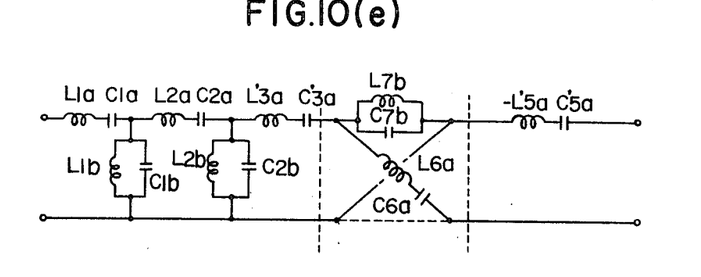
Figure 10F:
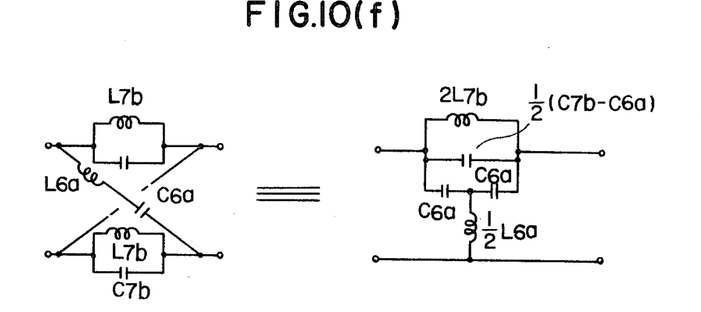

In order to avoid the above disadvantage, in this invention bridge T-type section such as shown in FIG. 9 is adopted and equivalent conversion circuits $(a)-(f)$ in FIG. 10 are skillfully adopted, whereby a positive band pass filter can be obtained.

Figure 11:
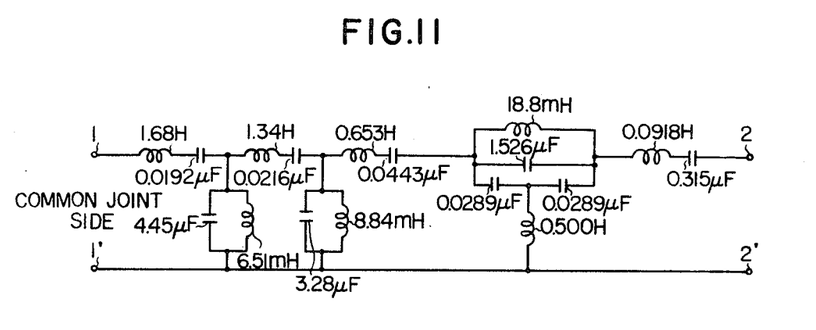

Let it be assumed now that $$\omega_2\times\omega_1=2\pi\times26(H_8)$$

$$\omega_1\cdot\omega_2=[2\pi\times935(H_8)]^2$$

$$R_2=600 \text{ ohms}$$

then a band pass filter as shown in FIG. 11 can be realized.

This example relates to the case in which n in $Q(j\Omega)$ is equal to 1, that is, $n=1$, but in the case also in which $n\geqq2$ a filter having an excellent pass band characteristic can be obtained by the same manner as in the case of the afore-mentioned example. This modified circuit includes several bridge T-type sections.

In the following example, formulation of a filter circuit having a low delay distortion and having real attenuation poles at finite frequencies of the attenuation region will be described.

This example relates to design of a low delay distortion type filter, in which $Z_{2s}$ has ninth power rank as indicated by the following Equation 42, real attenuation pole. ($\Omega=\Omega_a$) exists in the vicinity of 10, and voltage attenuation quantity becomes zero at $\Omega=2$ and 4.

$$Z_{2s}^{(9)}=j^2\frac{\frac{\pi}{2}\Omega\left(1-\frac{\Omega^2}{4}\right)\left(1-\frac{\Omega^2}{16}\right)\left(1-\frac{\Omega^2}{36}\right)\left(1-\frac{\Omega^2}{\Omega_a^2}\right)}{(1-\Omega^2)\left(1-\frac{\Omega^2}{9}\right)\left(1-\frac{\Omega^2}{25}\right)\left(1-\frac{\Omega^2}{49}\right)} \quad (42)$$

where $R_2=1$,

If attenuation pole is assumed to correspond to the condition $\Omega_a=10$, $$Y_{22}=\frac{1}{Z_{2s}^{(9)'}}=\frac{(1-\Omega^2)\left(1-\frac{\Omega^2}{9}\right)\left(1-\frac{\Omega^2}{25}\right)\left(1-\frac{\Omega^2}{49}\right)}{j\frac{\pi}{2}\Omega\left(1-\frac{\Omega^2}{4}\right)\left(1-\frac{\Omega^2}{16}\right)\left(1-\frac{\Omega^2}{36}\right)\left(1-\frac{\Omega^2}{100}\right)}=\frac{A}{B} \quad (43)$$

Now, if A, B and $-Y_{12}$ are put as follows, $$A=\frac{(1-\Omega^2)\left(1-\frac{\Omega^2}{9}\right)\left(1-\frac{\Omega^2}{25}\right)\left(1-\frac{\Omega^2}{49}\right)}{(1-a_2\Omega^2+a_4\Omega^4)\left(1-\frac{\Omega^2}{100}\right)} \quad (44)$$

$$B=\frac{j\frac{\pi}{2}\Omega\left(1-\frac{\Omega^2}{4}\right)\left(1-\frac{\Omega^2}{16}\right)\left(1-\frac{\Omega^2}{36}\right)}{1-a_2\Omega^2+a_4\Omega^2} \quad (45)$$

$$-Y_{12}=\frac{1}{B}=\frac{1-a_2\Omega^2+a_4\Omega^4}{j\frac{\pi}{2}\Omega\left(1-\frac{\Omega^2}{4}\right)\left(1-\frac{\Omega^2}{16}\right)\left(1-\frac{\Omega^2}{36}\right)} \quad (46)$$

B becomes zero at the positions $\Omega=2$ and 4. Accordingly, in order to make the voltage attenuation quantity zero, it is only necessary that $|A|=1$ at $\Omega=2$; 4. For this purpose, $\Omega=2$; 4 are put in the Equation 44 and $|A|=1$ is considered, whereby $a_2$ and $a_4$ are obtained, as follows.

$$a_2=\frac{-25}{395};\quad a_4=\frac{33}{6272} \quad (47)$$

If these values are put in the Equations 43 and 46 and $Y_{12}$ and $Y_{22}$ are decomposed, the $Y_{12}$ and $Y_{22}$ are represented by the following Equations 48 and 49.

$$-Y_{12}=\frac{2}{\pi}\left\{\frac{1}{j\Omega}-\frac{j\frac{225}{448}\Omega}{1-\frac{\Omega^2}{4}}+\frac{j\frac{99}{784}\Omega}{1-\frac{\Omega^2}{16}}-\frac{j\frac{793}{28224}\Omega}{1-\frac{\Omega^2}{36}}\right\} \quad (48)$$

$$Y_{22}=\frac{2}{\pi}\left\{\frac{1}{j\Omega}+\frac{j\frac{225}{448}\Omega}{1-\frac{\Omega^2}{4}}+\frac{j\frac{99}{784}\Omega}{1-\frac{\Omega^2}{16}}+\frac{j\frac{143}{2688}\Omega}{1-\frac{\Omega^2}{30}}+\frac{j\frac{21879}{156800}\Omega}{1-\frac{\Omega^2}{100}}\right\} \quad (49)$$

Although there are various conventional methods for realizing an actual circuit satisfying the said equations, a circuit having the most excellent and simple form, that is, the form adopted to compose the circuit by using circuit elements of minimum number and having a relation of $$k_{11}^{(\nu)}\cdot k_{22}^{(\nu)}=k_{12}^{(\nu)^2}$$

between the residues $$k_{11}^{(\nu)},\ k_{22}^{(\nu)},\ k_{12}^{(\nu)}$$

cannot be realized according to method, in which sections each including a given attenuation pole therein are cascaded. Reason of the above impossibility resides in that a circuit having attenuation poles at only the real frequencies (including infinite frequencies) can be realized, as well-known, by utilizing circuit elements number of which is equal to number (that is, power number) of the attenuation poles. However, it is generally difficult to realize a circuit having complex attenuation poles (including imaginary frequency attenuation poles) by the most simple form as mentioned above. A complex attenuation pole has at least four attenuation poles which are mutually conjugated, and circuit elements number of which is larger than power number are necessary for realizing the circuit having the complex attenuation poles, as disclosed, for example, in "Synthesis of Passive Networks" written by Ernst A. Guillemin.

In this invention, realization of the circuit having the above-mentioned conjugate attenuation poles and simple form has been attained by composing the circuit by parallel combination of only the most simple circuits each having required real frequency poles, thereby to cause complex attenuation poles exist as a whole. For this purpose, for example, the first and fourth terms on the right side of $Y_{12}$ represented by the Equation 48 are adjusted so as to be mutually mullified at $\Omega=\infty$, and this admittance matrix is decomposed into finite sections (in this example decomposed into three sections), whereby all sections can be converted to circuits having only real attenuation poles, that is, circuits of the most simple form can be obtained. For this purpose, $a_2$, $a_4$ ... $a_{2n}$, and $\Omega_\alpha$, $\Omega_\beta$ may be adusted, but in this example, only the position of $\Omega_\alpha$ is somewhat adjusted. In this case, residue number of a pole corresponding to $\Omega=6$ is $$\frac{2}{\pi} \cdot \frac{793}{1568}$$

and it is only necessary to adjust so that said residue number is equal to $$\left(\frac{2}{\pi} \cdot \frac{1}{2}\right)$$

because if this residue number relation is established, the circuit having, as its admittance matrix elements, sum of the first term (having pole at $\Omega=0$) and the fourth term (having pole at $\Omega=6$) and sum of the second term having pole at $\Omega=2$) and the third term (having pole at $\Omega=4$) in the Equations 48 and 49 can be realized by adopting circuit elements of minimum number less than that of the circuit elements of the case having no above-mentioned residue number relation. That is;

$$\left.\begin{aligned} 1-4a_2+16a_4 &= \frac{9}{7\left(1-\frac{4}{\Omega_\alpha^2}\right)} \\ 1-16a_2+256a_4 &= \frac{99}{35\left(1-\frac{16}{\Omega_\alpha^2}\right)} \\ 1-36a_2+1296a_4 &= 10 \end{aligned}\right\} \quad (50)$$

The unknown factors $a_2$, $a_4$ and $\Omega_\alpha$ can be obtained by solving the Equation 50, as follows.

$$\Omega_\alpha^2=104;\ a_2=\frac{89}{1400};\ a_4\frac{29}{5600}$$

If $Y_{12}$ and $Y_{22}$ are decomposed by use of the values of the Equation 51, the Equations 52 and 53 are obtained.

$$-Y_{12}=\frac{2}{\pi}\left\{\frac{1}{j\Omega}-\frac{j\frac{351}{175}\Omega}{4-\Omega^2}+\frac{j\frac{351}{175}\Omega}{16-\Omega^2}-\frac{j\Omega}{36-\Omega^2}\right\} \quad (52)$$

$$Y_{22}=\frac{2}{\pi}\left\{\frac{1}{j\Omega}+\frac{j\frac{351}{175}\Omega}{4\Omega^2}+\frac{j\frac{351}{175}\Omega}{16-\Omega^2}+\frac{j\frac{5577}{2975}\Omega}{36-\Omega^2}+\frac{j\frac{309206}{20825}\Omega}{104\Omega_2}\right\} \quad (53)$$

The fact that absolute values of the residue of the poles at $\Omega=2$ and 4 in $Y_{12}$ are equal to those in $Y_{22}$ is caused by adoption of the following relation.

$$B=0$$
$$|A|=|D|=1$$

The desired circuit has no real frequency attenuation pole at the positions except the positions where $\Omega=\infty$; and $$\Omega=\sqrt{104}\doteq 10.2$$

so that intimate coupling should be established at the poles of the circuit elements of the other admittance matrixs. That is, $$Y_{11}=\frac{2}{\pi}\left\{\frac{1}{j\Omega}+\frac{j\frac{351}{175}}{4-\Omega^2}+\frac{j\frac{351}{175}}{16-\Omega^2}+\frac{j\frac{2975}{5577}}{36-\Omega^2}\right\} \quad (54)$$

Now, Y matrix is divided into three components as represented by the following equations.

$$\left.\begin{aligned} Y_{11}^{(1)} &= \frac{2}{\pi}\left\{\frac{1}{j\Omega}+\frac{j\frac{2975}{5577}\Omega}{36-\Omega^2}\right\} \\ -Y_{12}^{(1)} &= \frac{2}{\pi}\left\{\frac{1}{j\Omega}-\frac{j\Omega}{36-\Omega^2}\right\} \\ Y_{22}^{(1)} &= \frac{2}{\pi}\left\{\frac{1}{j\Omega}+\frac{j\frac{5577}{2975}\Omega}{36-\Omega^2}\right\} \end{aligned}\right\} \quad (55)$$

$$\left.\begin{aligned} Y_{11}^{(2)} &= \frac{2}{\pi}\left\{\frac{j\frac{351}{175}\Omega}{4-\Omega^2}+\frac{j\frac{351}{175}\Omega}{16-\Omega^2}\right\} \\ -Y_{12}^{(2)} &= \frac{2}{\pi}\left\{-\frac{j\frac{351}{175}\Omega}{4-\Omega^2}+\frac{j\frac{351}{175}\Omega}{16-\Omega^2}\right\} \\ Y_{22}^{(1)} &= \frac{2}{\pi}\left\{\frac{j\frac{351}{175}\Omega}{4-\Omega^2}+\frac{j\frac{351}{175}\Omega}{16-\Omega^2}\right\} \end{aligned}\right\} \quad (56)$$

$$\left.\begin{aligned} Y_{11}^{(3)} &= 0 \\ -Y_{12}^{(3)} &= 0 \\ Y_{22}^{(3)} &= \frac{2}{\pi}\left\{\frac{j\frac{309206}{20825}\Omega}{104-\Omega^2}\right\} \end{aligned}\right\} \quad (57)$$

The component represented by the Equation 55 and the component represented by the equation 56 have tripple attenuation poles at $\Omega=\infty$ respectively, and can be realized by adopting circuit elements number of which is less than that of the cases having no said tripple attenuation poles. The component matrix represented by the Equation 57 forms a shunt admittance establishing the real attenuation pole. The result of the present example corresponds to the parallel connection of the circuits represented by the afore-mentioned three component matrixs.

If the first component matrixs represented respectively by the Equations 55 and 56 are converted to impedance matrixs, the following results are obtained.

$$\left.\begin{aligned} Z_{11}^{(1)} &= j1.0244\Omega+\frac{1}{j0.07795\Omega} \\ Z_{12}^{(6)} &= \frac{1}{j0.07795\Omega} \\ Z_{22}^{(1)} &= j0.5464\Omega+\frac{1}{j0.07795\Omega} \end{aligned}\right\} \quad (58)$$

$$\left.\begin{aligned} Z_{11}^{(2)} &= \frac{1}{j0.2554\Omega} \\ Z_{12}^{(2)} &= -\frac{1}{j0.4256\Omega} \\ Z_{22}^{(2)} &= j0.3916\Omega+\frac{1}{j0.2554\Omega} \end{aligned}\right\} \quad (59)$$

$$Z_{12}^{(1)}$$

in the first component is positive, but $$Z_{12}^{(2)}$$

in the second component is negative, so that a phase inversion transformer is necessary. When the above component circuits are parallelly connected, the circuit of FIG. 12 is obtained.

However, if the circuit is formed as a balanced type, the phase inversion transformer is not necessary. Furthermore, when the band pass filter is converted, it is possible to make the phase inversion transformer unnecessary by adding a winding to the coil of parallel resonant circuit even when the circuit is of unbalanced type.

Figure 12:
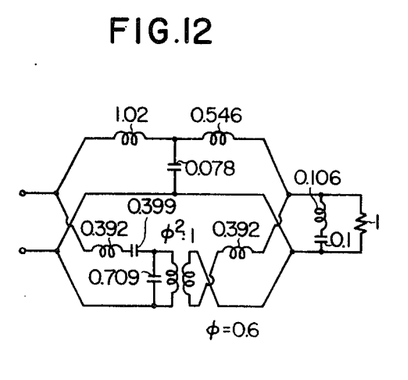
FIG. 12 shows a circuit connection diagram of a filter having complex attenuation poles and manufactured according to this invention, said filter consisting of combination of component circuits each having the most simple form, and having necessary real frequency attenuation poles.
Figure 13:
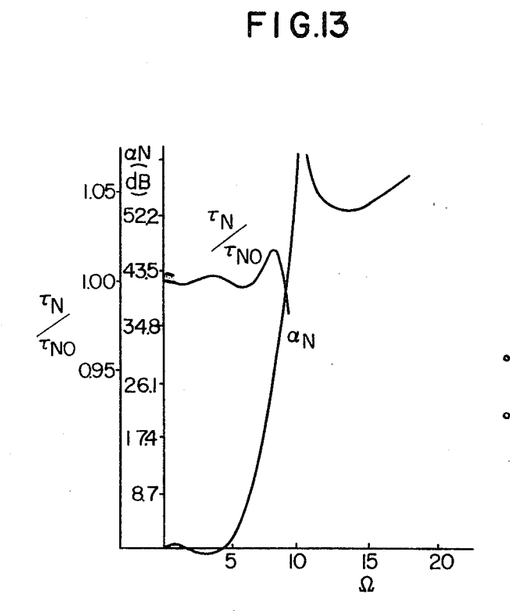

Accordingly, in FIG. 12, number of circuit element, except the phase inversion transformer becomes nine, and $$Z_{22}^{(9)'}$$

is ninth power rank as shown in the Equation 42, so that the present circuit has circuit elements of minimum number. Of course, the present invention can be applied to other cases having other power ranks. By detecting the voltage delay characteristic of the present example from the residue numbers of all poles of $Y_{22}$, it can be confirmed that deviation of the delay time is within the range less than 0.286% with respect to normalized value at $0<\Omega<4$ and even at $4<\Omega<6$ the deviation is within the range less than 6.7%, so that the formed circuit has very excellent linearity. Voltage attenuation characteristic of the present example is shown in FIG. 13.

As clear from relation of the Equations 17-3, 18-2 and FIG. 3, the above explanation has been made in connection with the voltage characteristic as illustration, but the same explanation may be applicable for current attenuation quantity and current phase shift. That is, it is only necessary to apply the theory described in connection with A and B to C and D. Furthermore, since referring to working attenuation quantity and working phase shift, the working transmission coefficient can be obtained as an arithmetic mean value of the voltage transmission coefficient and current transmission coefficient, application of the above-mentioned theory may be, of course, possible.

Furthermore, for the purpose of realizing the most simple circuit, adjustment of residue numbers has been considered in connection with $Y_{12}$ and $Y_{22}$ in the case of voltage transmission coefficient, but said adjustment should be applied to $Z_{12}$ and $Z_{22}$ (or $Y_{11}$ and $Y_{12}$) in the case of current transmission coefficient and to $Z_{11}$, $Z_{12}$, $Z_{22}$ (or $Y_{11}$, $Y_{12}$, $Y_{22}$) in the case of working transmission coefficient.

We claim:

1. A filter having a low delay distortion and a low attenuation distortion and consisting of a lumped constant four terminal network; characterized by that when spectral impedance $(Z_{2s})_{sp}$ and spectral admittance $(Y_{2f})_{sp}$ are defined respectively as ($\pi/2 \times$ residue number of secondary short-circuit impedance $(Z_{2s})$) and ($\pi/2 \times$ residue number of open-circuit admittance $(Y_{2f})$) of said network and $\Omega$ is equal to $$2\sqrt{L_oC_o}\frac{l}{\pi}$$

where $l$ is length of a lossless uniform line; $L_o$ and $C_o$ are respectively inductance and capacitance per unit length of said line, said network is composed of circuit elements including respectively inductance and capacitance which are obtained from a spectral impedance $$(Z_{2s}^{(m+1)})_{sp}$$

or spectral admittance $$(Y_{2f}^{(m+1)})_{sp}$$

corresponding to two terminal short-circuit impedance $$(Z_{2s}^{(m+1)})$$

for admittance $$(Y_{2f}^{(m+1)})$$

which is obtained by superposing the short-circuit impedances $$(Z_{2s}^{m})$$

and $$(Z_{2s}^{(m+1)})$$

or superposition of the short-circuit admittances $$(Y_{2f}^{m})$$

and $$(Y_{2f}^{(m+1)})$$

at a ratio of $1/n$, where $m$ and $n$ are integers, said $$Y_{2f}^{m}(\text{or } Z_{2s}^{m})$$

said $$Y_{2f}^{(m+1)}(\text{or } Z_{2s}^{(m+1)})$$

being represented by the following equations, respectively $$Y_{2f}^{m}(\text{or } Z_{2s}^{m}) = j\frac{\pi}{2} \cdot \frac{\Omega\left(1-\frac{1}{4}\Omega^2\right)\cdots\left(1-\frac{1}{(m-2)^2}\Omega^2\right)}{(1-\Omega^2)\left(1-\frac{1}{9}\Omega^2\right)\cdots\left(1-\frac{1}{(m-1)^2}\Omega^2\right)}$$

(in the case of grade $m$)

$$Y_{2f}^{(m+1)}(\text{or } Z_{2s}^{(m+1)}) = j\frac{\pi}{2} \cdot \frac{\Omega\left(1-\frac{1}{4}\Omega^2\right)\cdots\left(1-\frac{1}{m^2}\Omega^2\right)}{(1-\Omega^2)\cdots\left(1-\frac{1}{(m-1)^2}\Omega^2\right)}$$

(in the case of grade $(m+1)$)

and that when the voltage attenuation quantity $(\alpha_N)$ or current attenuation quantity $(\alpha_M)$ of said network are represented by the following Equation (a)

$$\left.\begin{array}{l}\alpha_N = 20\log_{10}\left|\frac{\sqrt{(A(j\Omega))^2+(B(j\Omega))^2}}{Q(j\Omega)}\right| \\ \alpha_M = 20\log_{10}\left|\frac{\sqrt{(D(j\Omega))^2+(Cj\Omega)^2}}{Q(j\Omega)}\right|\end{array}\right\} \quad (a)$$

where A, B, C, D correspond to factors in the following relations:

$$Z_{2s}\Big|_{V_1=0} = \frac{B}{A}; \quad Z_{2f}\Big|_{I_1=0} = \frac{D}{C}$$

$Z_{2s}$, $Z_{2f}$, $V_1$ and $I_1$ being secondary short-circuit impedance, open-circuit impedances, input voltage and input current of said network, and $Q(j\Omega)$ is represented by the following equation $$Q(j\Omega) = 1 + a_2\Omega^2 + a_4\Omega^4 + \cdots a_{2n}\Omega^{2n} \quad (b)$$

$a_2, a_4 \ldots a_{2n}$ being $$m\left(=\frac{n}{2}\right)$$

points within the pass band, said network is composed of a ladder circuit including several bridge T-type sections circuit elements of which have transmission characteristic of the above Equation $a$, coefficient factors $a_2, a_4 \ldots a_{2n}$ of said Equation $a$ being determined from the following simultaneous Equations $c$ and $d$ $$n: \text{even } \alpha_N(\text{or } \alpha_M) = 0; \frac{d\alpha_N}{d\Omega}\left(\text{or }\frac{d\alpha_M}{d\Omega}\right) = 0 \quad (c)$$

$$\left.\begin{array}{l}n: \text{odd } \alpha_N(\text{or } \alpha_M) = 0; \frac{d\alpha_N}{d\Omega}\left(\text{or }\frac{d\alpha_M}{d\Omega}\right) = 0 \\ \left[\frac{d^2\alpha_N}{d\Omega^2}\right]_{\Omega=0}\left(\text{or }\left[\frac{d^2\alpha_M}{d\Omega^2}\right]_{\Omega=0}\right) = 0\end{array}\right\} \quad (d)$$

2. A filter having low delay and attenuation distortions and real frequency attenuation poles at attenuation range and consisting of a lumped constant four terminal network; characterized by that when spectral impedance $(Z_{2s})_{sp}$ and spectral admittance $(Y_{2f})_{sp}$ are defined respectively as ($\pi/2 \times$ residue number of secondary short-circuit impedance $(Z_{2s})$) and ($\pi/2 \times$ residue number of open-circuit admittance $(Y_{2f})$) of said network and $\Omega$ is equal to $$2\sqrt{L_oC_o}\frac{l}{\pi}$$

where $l$ is length of a lossless uniform line; $L_o$ and $C_o$ are respectively inductance and capacitance per unit length of said line, said network is composed of circuit elements including respectively inductance and capacitance which are obtained from a spectral impedance $$(Z_{2s}^{(m+1)})_{sp}$$

for spectral admittance $$(Y_{2f}^{(m+1)})_{sp}$$

corresponding to two terminal short-circuit impedance $$(Z_{2s}^{(m+1)})$$

or admittance $$(Y_{2f}^{m+1})$$

which is obtained by superposing the short-circuit impedances $$(Z_{2s}^{m})$$

and $$(Z_{2s}^{(m+1)})$$

or superposition of the short-circuit admittances $$(Y_{2f}^{m})$$

and $$(Y_{2f}^{(m+1)})$$

at a ratio of $1/n$, where $m$ and $n$ are integers, said $$Y_{2f}^{m}(\text{or } Z_{2s}^{m})$$

and $$Y_{2f}^{(m+1)}(\text{or } Z_{2s}^{(m+1)})$$

being represented by the following equation, respectively:

$$Y_{2f}^{m}(\text{or } Z_{2s}^{m}) = j\frac{\pi}{2} \cdot \frac{\Omega\left(1-\frac{1}{4}\Omega^2\right)\cdots\left(1-\frac{1}{(m-2)^2}\Omega^2\right)}{(1-\Omega^2)\left(1-\frac{1}{9}\Omega^2\right)\cdots\left(1-\frac{1}{(m-1)^2}\Omega^2\right)}$$

(in the case of grade $m$)

$$Y_{2f}^{(m+1)}(\text{or } Z_{2s}^{(m+1)}) = j\frac{\pi}{2} \cdot \frac{\Omega\left(1-\frac{1}{4}\Omega^2\right)\cdots\left(1-\frac{1}{m^2}\Omega^2\right)}{(1-\Omega^2)\cdots\left(1-\frac{1}{(m-1)^2}\Omega^2\right)}$$

(in the case of grade $(m+1)$)
and that when voltage attenuation quantity $\alpha_N$ or current attenuation quantity $\alpha_M$ of said network are represented by the following Equation (e)

$$\alpha_N = 20 \log_{10} \left| \frac{\sqrt{(A(j\Omega))^2 + (B(j\Omega))^2}}{Q(j\Omega)\left(1-\frac{\Omega^2}{\Omega_a^2}\right)\left(1-\frac{\Omega^2}{\Omega_b^2}\right)\cdots\left(1-\frac{\Omega^2}{\Omega_i^2}\right)} \right| \quad (e)$$

$$\alpha_M = 20 \log_{10} \left| \frac{\sqrt{D(j\Omega))^2 + (C(j\Omega))^2}}{Q(j\Omega)\left(1-\frac{\Omega^2}{\Omega_a}\right)\left(1-\frac{\Omega^2}{\Omega_b}\right)\cdots\left(1-\frac{\Omega^2}{\Omega_i^2}\right)} \right|$$

where $\Omega_a, \Omega_b \ldots \Omega_l$ are attenuation poles during attenuation range A, B, C, D correspond to factors in the following relations $$Z_{2s}\bigg|_{V_1=0} = \frac{B}{A}; \quad Z_{2f}\bigg|_{I_1=0} = \frac{D}{C}$$

$Z_{2s}$, $Z_{2f}$, $V_1$ and $I_1$ being secondary short-circuit impedance, open-circuit impedance, input voltage and input current of said network, and $Q(j\Omega)$ is represented by the following equation $$Q(j\Omega) = 1 + a_2\Omega^2 + a_4\Omega^4 + \ldots a_{2n}\Omega^{2n} \ldots \quad (b)$$

$a_2, a_4 \ldots a_{2n}$ and the poles $\Omega_a, \Omega_b \ldots \Omega_l$ being respectively $m$ points within pass band range; said network is composed of a parallel combination of several component ladder circuits of the most simple form, said ladder circuits being respectively composed of the following component admittance matrix (f)

$$\begin{bmatrix} Y_{11} Y_{12} \\ Y_{12} Y_{22} \end{bmatrix} = \sum_{\nu=0}^{l-1} \begin{bmatrix} \dfrac{2k_{11}^{(\nu)}\Omega}{\alpha_\nu^2 - \Omega^2} & \dfrac{2k_{12}^{(\nu)}\Omega}{\alpha_\nu^2 - \Omega^2} \\ \dfrac{2k_{12}^{(\nu)}\Omega}{\alpha_\nu^2 - \Omega^2} & \dfrac{2k_{22}^{(\nu)}\Omega}{\alpha_\nu^2 - \Omega^2} \end{bmatrix} \quad (f)$$

where $l$ is power rank of the network determined by the Equation (e) and $$k_{11}^{(\nu)}, k_{12}^{(\nu)}, k_{22}^{(\nu)}$$

are respectively residue numbers at pole $\alpha_\nu$ of each component admittance section, and said coefficient factors $a_2, a_4 \ldots a_{2n}$ and $\Omega_a, \Omega_b \ldots \Omega_l$ being determined from solving the multiple simultaneous Equations (f), (b) by taking the conditions (g)

$$k_{11}^{(\nu)} \times k_{22}^{(\nu)} = k_{12}^{(\nu)2} \quad (g)$$

in consideration.

References Cited

UNITED STATES PATENTS

| | | | |
|---|---|---|---|
| 2,760,167 | 8/1956 | Hester et al. | 333—70 |
| 3,122,716 | 2/1964 | Whang | 333—28 |
| 3,271,705 | 9/1966 | Karkar | 333—76 |
| 3,365,679 | 1/1968 | Matsumoto | 333—28 |
| 1,828,454 | 10/1931 | Bode | 333—70 |

HERMAN KARL SAALBACH, Primary Examiner

C. BARAFF, Assistant Examiner

U.S. Cl. X.R.

333—28, 70